(12) United States Patent
Mueller

(10) Patent No.: US 7,283,497 B2
(45) Date of Patent: Oct. 16, 2007

(54) METHOD FOR TRANSFERRING A TUNNEL BETWEEN NODES IN GPRS SYSTEM

(75) Inventor: Hans Mueller, München (DE)

(73) Assignee: Siemens Aktiengesellschaft, Munich (DE)

( * ) Notice: Subject to any disclaimer, the term of this patent is extended or adjusted under 35 U.S.C. 154(b) by 915 days.

(21) Appl. No.: 10/276,730

(22) PCT Filed: May 9, 2001

(86) PCT No.: PCT/DE01/01757

§ 371 (c)(1),
(2), (4) Date: Apr. 15, 2003

(87) PCT Pub. No.: WO01/89232

PCT Pub. Date: Nov. 22, 2001

(65) Prior Publication Data

US 2003/0153296 A1    Aug. 14, 2003

(30) Foreign Application Priority Data

May 16, 2000   (DE)   .................... 100 23 963
Aug. 4, 2000   (DE)   .................... 100 38 182

(51) Int. Cl.
*H04Q 7/00*   (2006.01)

(52) U.S. Cl. ........................ 370/331; 370/401

(58) Field of Classification Search ................ 370/338, 370/231, 328, 237, 331, 352, 341, 392, 395.21, 370/349, 230.1; 455/445, 408, 414.1
See application file for complete search history.

(56) References Cited

U.S. PATENT DOCUMENTS 6,233,458 B1 *   5/2001   Haumont et al. ........... 455/445

(Continued)

FOREIGN PATENT DOCUMENTS

EP   0 971 553 A2   1/2000

OTHER PUBLICATIONS

3G TS 23.060, v3.3.0, "3rd Generation Partnership Project; Technical Specification Group Services and System Aspects; General Packet Radio Service (GPRS); Service Description; Stage 2." c. Apr. 2000.

*Primary Examiner*—Chau Nguyen
*Assistant Examiner*—Kenneth R Hartmann
(74) *Attorney, Agent, or Firm*—Bell, Boyd & Lloyd, LLC

(57) ABSTRACT

The invention relates to a method for transferring a tunnel from a first operating node (SGSN1) of a mobile radio communication system, especially a GPRS system, to a second operating node (SGSN2). The mobile radio communication system comprises operating nodes (SGNS1, SGNS2) and a gateway node (GGSN), at least one of these nodes being a node according to version 0 of the GTP protocol, and others being nodes according to version 1 of the GTP protocol. When the first operating node (SGSN1) is the node according to version 0, the request to adapt the context contains IMSI and NSAPI information of the tunnel concerned in order to correctly transfer said tunnel. If the second operating node (SGSN2) or the gateway node (GGSN) is a node according to version 0, the first operating node (SGSN1) allocates a flow label to the context, and the second operating node (SGSN2) sends the request to adapt the context of the tunnel concerned along with said allocated flow label.

17 Claims, 3 Drawing Sheets

U.S. PATENT DOCUMENTS 6,728,208 B1 * 4/2004 Puuskari ................... 370/230.1
6,839,339 B1 * 1/2005 Chuah ........................ 370/349
7,023,825 B1 * 4/2006 Haumont et al. ........... 370/338

* cited by examiner

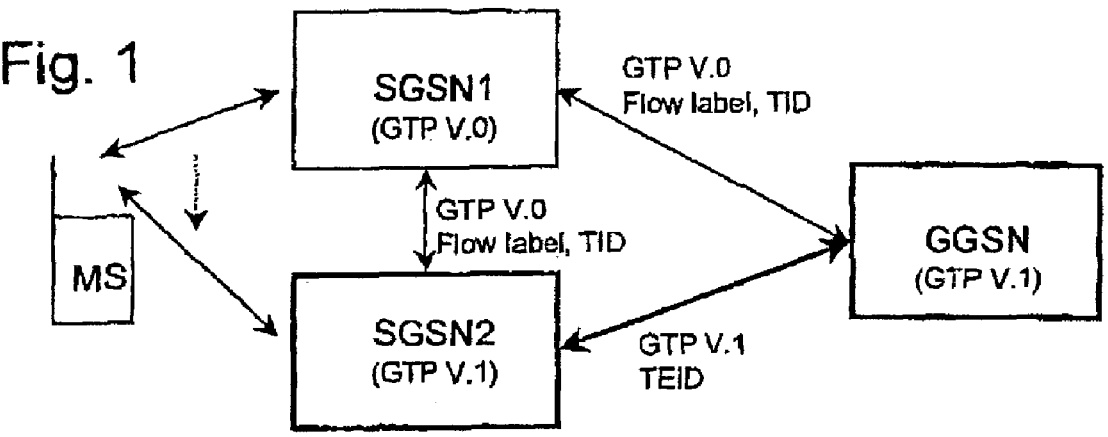
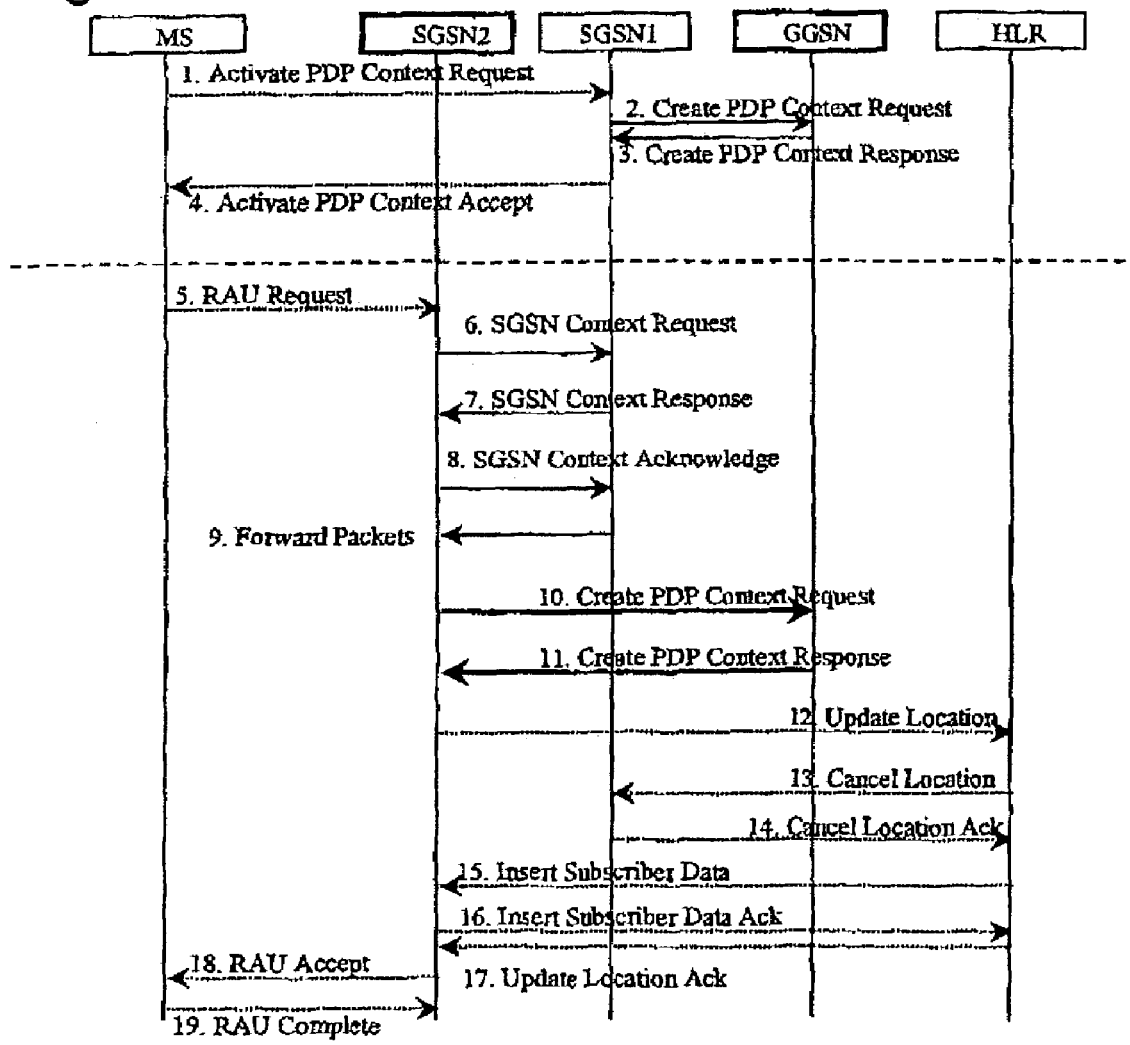

METHOD FOR TRANSFERRING A TUNNEL BETWEEN NODES IN GPRS SYSTEM

CLAIM FOR PRIORITY

This application claims priority to International Application No. PCT/DE01/01757 which was published in the German language on Nov. 22, 2001.

TECHNICAL FIELD OF THE INVENTION

The present invention relates to a method for transferring a tunnel from a first controlling node in a General Packet Radio Service ("GPRS") to a second.

BACKGROUND OF THE INVENTION

A tunnel has to be transferred when a mobile terminal which is using the relevant tunnel moves from the coverage area of the first controlling node into that of the second. This move results in an RAU (Routing Area Update), in the course of which data relating to the PDP context of the terminal is passed from the first controlling node to the second controlling node. This data is transmitted in the form of messages as in the GTP protocol (GPRS Tunnel Protocol). Messages in the GTP protocol are used inter alia for setting up and clearing PDP contexts and for passing on PDP contexts in the case of routing area updates. For details relating to the GTP protocol, reference should be made to the specification document 3G TS 23.060 Technical Specification Group Services and System Aspects; General Packet Radio Service (GPRS); Service Description; Stage 2 (Release 1999), for example in Version V3.3.0 dated April 2000 from the 3GPP ($3^{rd}$ Generation Partnership Project, 3GPP.org).

Data transmitted between the two controlling nodes makes it possible for the second controlling node to receive a contact for a gateway node and to use this to create the required complete information about the context, in order to allow it then to switch the GTP tunnel so that the service for the terminal can be continued without any interruption.

Two versions of the GTP protocol have been standardized to date, firstly the GTP Version 0, also referred to as Release 98 or 97, in GSM 09.60; secondly GTP Version 1, also referred to as Release 99, in the already mentioned publication TS 23.060. The standardization in Version 1 demands that nodes of the Version 1 type are intended to be able to interact with those of the Version 0 type, and that the GTP tunnels are operated using the respectively highest possible version.

In order that a receiving node can identify the GTP version which was used to produce a received message, the headers in each of the messages each include an identifier which allows association with the respective version. Messages which have been produced using Version 1 cannot be interpreted by nodes which are operating on the basis of Version 0 or even older standardizations. A node of the Version 1 type must therefore be able, depending on the GTP version which a node to which it is sending messages is using, to produce these messages either in accordance with Version 1 or Version 0.

One major difference between Version 0 and Version 1 of the GTP protocol is the method which is used to allocate a message to the tunnel which has been set up or to a PDP context. So-called tunnel identifiers, TIDs for short, are used for this purpose in Version 0, and are transmitted as part of the message, and are composed of the IMSI (International Mobile Subscriber Identity) and the NSAPI (Network Layer Service Access Point Identifier). IMSI is the worldwide unique identification number of a subscriber; NSAPI references one of a number of PDP contexts which may be associated with the subscriber. Since the tunnel identifier has a length of 12 bytes and is therefore quite cumbersome, so-called flow labels with a length of 2 bytes are additionally used instead of it, allowing rapid association of messages with a context. However, the flow labels are not necessarily allocated uniquely, since they have a value range of only about 65,000, and considerably more contexts can be set up for each node.

The flow labels are in each case allocated on activation of a GTP tunnel. Each node involved in a tunnel in this case signals to the opposing node the flow label with which it wishes to receive subsequent messages on this tunnel or, and this is completely equivalent, for this PDP context. In the first message which is sent in the course of setting up a tunnel from a controlling node to a gateway node (Create PDP Context Request), the flow label is set to 0 because the gateway node cannot yet allocate a flow label, and the tunnel identifier is transmitted. All subsequent messages in this tunnel must be sent using the flow label allocated by the gateway node. To be precise, two flow labels are allocated in each case, one for signaling and one for data. However, only the flow label for signaling will be considered in the following text.

In GTP Version 1, so-called TEIDs (Tunnel Endpoint Identifiers) are allocated, which have the same function as the flow labels, but have a length of 4 bytes. The TEIDs are thus not compatible with Version 0 flow labels, but they can be allocated uniquely. The tunnel identifier which is known from Version 0 is no longer included in Version 1 messages. The IMSI and NSAPI, which allow unique association of the message with a PDP context, are included only in the first message (Create PDP Context Request) from the controlling node to the gateway node.

Both versions of the GTP operate correctly within the respective version. The standardization requires that a Version 1 node must also support GPT Version 0, that is to say it must be backward-compatible. This is necessary in order that different node versions can interact.

However, problems occur when a mobile radio subscriber is moving in a network which includes different node versions and, in the process, moves from the coverage area of one controlling node to that of another. This change results in an RAU (Routing Area Update), in which a tunnel from the node in whose coverage area the subscriber was previously located is transferred to the node of the new coverage area. In the course of this procedure, data about the PDP context must be passed by means of GTP messages from the old node to the new node. This data requires the new node to make contact with the gateway node and to switch the GTP tunnel, so that the service can be continued without any interruption for the subscriber. If all three nodes which are involved in the switching of the tunnel are to the same GTP version, there are no problems in the switching process. Even if two of them are Version 0 nodes and the third is a Version 1 node, there are no problems since all the messages interchanged between the nodes must be GTP Version 0 messages. However, if two of the nodes are of the Version 1 type and the third is of the Version 0 type, the fact that the two nodes of the Version 1 type communicate with one another using Version 1 messages and communicate with that in the third node using Version 0 messages leads to difficulties. Three situations can be distinguished.

1. The mobile radio subscriber moves from a first controlling node of the Version 0 type to a second controlling node of the Version 1 type. In this situation, GTP Version 0 must be used for the first controlling node to communicate with the second and with the gateway node; Version 1 is used for the communication between the gateway node and the second controlling node. When setting up the tunnel, the gateway node allocates a flow label, which is used by the first controlling node to identify messages associated with that tunnel. When the two controlling nodes make contact, in order to prepare for the transfer of the tunnel, they communicate using Version 0, and the first controlling node supplies the second with the flow label which was originally allocated to the tunnel by the gateway node. In order to receive necessary context data for the tunnel from the gateway node, the second controlling node would have to be able to send a message to the gateway node using this flow label. However, the second controlling node and the gateway node communicate using Version 1, which does not allow the transmission of flow labels. A Version 1 TEID could admittedly be transmitted instead of the flow label, however, no such TEID is defined in the gateway node for the tunnel. The gateway node can therefore not allocate any message of the GTP Version 1 type to the existing channel. Since the "Update PDP Context Request" message includes neither IMSI nor NSAPI, the gateway node is also then unable to find the context, if it ignores the TEID.

2. The mobile radio subscriber moves from the first controlling node of the Version 1 type to a controlling node of the Version 0 type. In this situation, GTP Version 1 has been used for the communication between the first controlling node and the gateway node in the course of setting up the tunnel, that is to say, although a TEID has been defined for the tunnel, no flow label has been defined GTP Version 0 must be used for the communication between the two controlling nodes, but this allows only flow labels. There is no way to transmit the TEID to the second node and, even if such a way were to exist, it could not be processed. It is therefore impossible for the second controlling node to find the flow labels by means of which it could request the required context data from the gateway node.

3. The mobile radio subscriber moves from a controlling node of the Version 1 type to another of the same version, although the gateway node is operating on Version 0. In this situation, the controlling nodes communicate with one another using Version 1, but communicate with the gateway node using Version 0. The gateway node thus allocates a flow label when setting up a tunnel, but this cannot be transmitted from the first node to the second node so that it also cannot check the context information from the gateway node.

SUMMARY OF THE INVENTION

The invention discloses a method for transferring a tunnel from a first controlling node in a GPRS system to a second controlling node, which method operates even when the controlling nodes and the gateway node include at least one node of the Version 0 type and other nodes of the Version 1 type of the GTP protocol.

In the embodiment where the first controlling node is a node of the Version 0 type and the second controlling node and the gateway node are nodes of the Version 1 type, the invention provides for the request for adaptation of the context which the second controlling node sends to the gateway node to include details of the IMSI and NSAPI of the relevant tunnel. These details allow the gateway node to produce a unique match with a stored context, and thus to supply the required context data to the second node.

The required details of the IMSI and NSAPI can be transmitted in a very simple way by the second controlling node and the gateway node continuing to operate the tunnel which was set up using Version 0 of the GTP protocol using the same protocol version. In this situation, the request to be sent from the second node to the gateway node, in order to adapt the context, the "Update PDP Context Request" message, includes these required details from the start. This solution thus includes the protocol which the second controlling node uses to communicate with the gateway node being dependent on the previous history of the tunnel with which the messages that are being exchanged are associated. If a tunnel has been set up from the second node itself or from another node of the Version 1 type, the communication with the gateway node takes place using Version 1. If the tunnel was originally set up from a node of the Version 0 type, then the communication with the gateway node still takes place using Version 0, even though both the nodes involved can cope with Version 1.

Such control of the version that is used can be achieved in a simple manner if the first controlling node first sends a message (SGSN Context Response) which initiates the tunnel allocation process to the second controlling node, the second controlling node uses the version used for this message for its request for matching of the context to the gateway node, and the gateway node responds to the messages sent to it using the version in which it has received them.

An alternative possibility is for the second node to send a message of the "Create PDP Context Request" type, based on Version 1, instead of the conventional "Update PDP Context Request" message as the request for adaptation of the tunnel. In accordance with the document TS 29.060 cited above, this message is processed correctly by the receiving gateway node, that is to say the existing. PDP context is found once again and the changed parameters are replaced. In this way, not only is the tunnel routed to the second controlling node, but the version is also changed.

In another embodiment, it is possible to provide for the "Update PDP Context Request" message also to be sent with a TEID which has the value 0 and additionally to include the IMSI and NSAPI in addition to the information elements envisaged in accordance with TS 23.060, in order to allow association with the appropriate PDP context in the gateway node.

In the embodiment where the second controlling node or the gateway node is a node of the Version 0 type, and each of the other nodes are of the Version 1 type, a flow label which the second controlling node and the gateway node require in order to transfer the tunnel from the first controlling node to the second controlling node are made available to the second controlling node by the first controlling node.

In this case, there are various possible ways for allocating the flow label. If the gateway node is a node of the Version 1 type, and the channel has thus been set up using Version 1, then the tunnel would have been allocated a TEID but no flow label during the setting-up process. In this situation, it is expedient for the first controlling node to allocate a flow label to the tunnel.

One aspect provides for the first controlling node to allocate a flow label to the context with a value which is specific for the transfer of a tunnel from a controlling node of the Version 1 type to a controlling node of the Version 0 type, that is to say which is different from the flow labels which are used for communication by nodes which normally operate using Version 0. The second controlling node can react to the reception of such a specific flow label by sending, instead of a "Update PDP Context Request" message which it would normally send to the gateway node if it had received a correct flow label from a first controlling node of the same version, a "Create PDP Context Request" message to the gateway node, the message including IMSI and NSAPI and thus allowing unique identification of the context to be matched to the gateway node. Alternatively, it is also possible to provide for the second controlling node to send an "Update PDP Context Request" message to the gateway node which, although it additionally includes the IMSI and NSAPI which the applicable Version 1 protocol does not, thus in turn allows an identification. A procedure such as this is possible because the existing standard does not provide for PDP update requests with a flow label 0, and their processing is thus not standardized.

In still another embodiment of the invention, which can likewise be used if the gateway node is operating using Version 1 and the second controlling node is operating using Version 0 provides for the gateway node to allocate to each context which is established by the first controlling node of the Version 1 type not only a TEID but at the same time to provide a defined method on the basis of which it can allocate a flow label to each context established using Version 1 or, to be more precise, to TEID. There is thus a TEID and a flow label corresponding to each context established using GTP Version 1 in the gateway node. The gateway node can expediently take account of the flow labels resulting from this even when allocating TEIDs, such that context can be identified effectively on the basis of the flow labels. The same method is also available to the first controlling node. If a tunnel which has been established from the first controlling node using GTP Version 1 has to be transferred to a second controlling node using Version 0, then the first controlling node can determine the correct value for the flow label directly by using the method, and can provide this to the second controlling node, on the basis of which the gateway node can identify the PDP context. The second controlling node can thus respond to the gateway node in the same way as if the tunnel had been transferred to it from a controlling node of the Version 0 type.

A preferred embodiment for allocating the flow label to a TEID is to equate the flow label to the two least significant bytes of the TEID. If, on the other hand, the gateway node is a node of the Version 0 type and the two controlling nodes are nodes of the Version 1 type, then the allocation of a flow label to the tunnel is actually carried out during its setting-up procedure by the gateway node, and this flow label is known to the first controlling node. In order to transmit this flow label to the second node—using Version 1 messages—it is expedient to "pack" it in the TEID field of a Version 1 message.

Since the flow label does not fill the TEID field, it is advantageously possible to use the remaining space in the TEID field for transmitting a predetermined value, which otherwise is not used in a TEID and from which it is thus possible for the second controlling node to identify that the transmitted value is not a TEID but a "packed" flow label, and can process this correctly as appropriate for its value. One such predetermined value may, for example, be 0.

BRIEF DESCRIPTION OF THE DRAWINGS

Exemplary embodiments will be explained in more detail in the following text with reference to the drawings, in which:

FIGS. 1 to 3 show embodiments for transferring a tunnel between two controlling nodes with the involvement of in each case two nodes of the GTP Version 1 type and one node of Version 0 type.

FIGS. 4 to 6 show a signaling procedure for the transfer of the tunnel in the various embodiments.

DETAILED DESCRIPTION OF THE INVENTION

Figure 2:
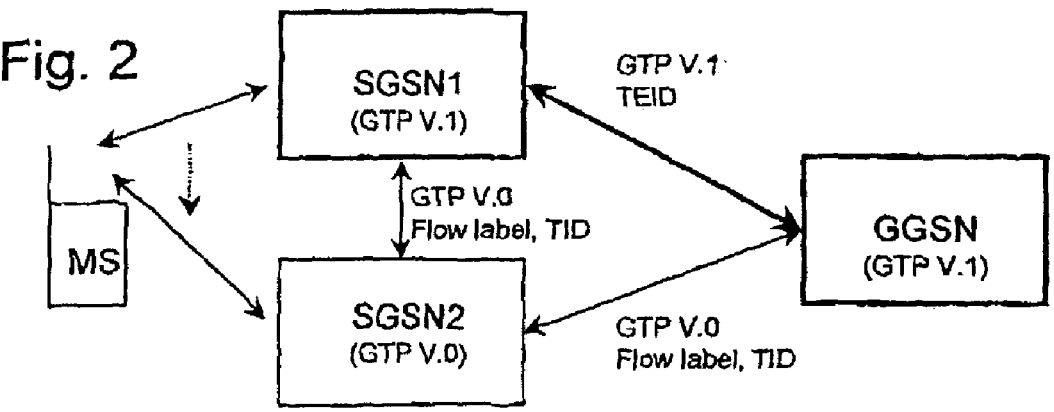

In the embodiment shown in FIG. 1, the first controlling node SGSN1, via which the tunnel for the terminal MS was originally set up, is a node of the GTP Version 0 type; it communicates with the gateway node GGSN and with the second controlling node SGSN2 using GTP Version 0, that is to say the messages which are exchanged are identified by a flow label and TEID. The gateway node GGSN and the second controlling node SGSN2 communicate with one another using Version 1, with messages identified by TEIDs.

FIG. 4 shows the signaling procedure between a terminal MS and the three nodes SGSN1, SGSN2 and GGSN on the one hand on activation of a PDP context and on the other hand during the transfer of the GTP tunnel. In this case, messages of the GTP Version 0 type are represented by thin arrows, and messages of the Version 1 type represented by thick arrows. Messages which are not exchanged between nodes and are thus not linked to the GTP protocol, such as the messages exchanged with the terminal MS, are represented by dashed lines.

In 1, the terminal MS sends a request for activation of a PDP context (Activate PDP Context Request) to the SGSN0 which, inter alia, specifies the NSAPI and nature and/or quality of the desired service. The controlling node SGSN1 then passes a "Create PDP Context Request" using PDP Version 0 to the gateway node GGSN, in which the IMSI and NSAPI are signaled to the gateway node (2). The gateway node then produces a new entry in its PDP context table, which allows it to route data packets of the terminal MS between the SGSN1 and an external PDP network, which is not shown in the figures, and to calculate charges, and allocates a flow label thereto. As confirmation, in 3, it sends a "Create PDP Context Response" message back to the first controlling node SGSN1, said message including the allocated flow label. The first controlling node itself confirms the setting up of the context to the terminal MS by means of an "Activate PDP Context Accept" message (4).

The allocated flow label makes it possible for the SGSN1 to identify data packets of the terminal MS which are associated with the newly set up context, such that the gateway node GGSN can distinguish between them and the data packets of other terminals or data packets associated with other contexts of the same terminal.

The process for transferring a tunnel starts in 5 by the terminal sending a "Routing Area Update Request" to the second controlling node SGSN2. This node SGSN2 operates using GTP Version 1.

First, the first controlling node SGSN1 is informed by means of an "SGSN Context Request" message based on GTP Version 0 (6) that the context is intended to be transferred; the SGSN1 confirms this by means of an "SGSN Context Response" message (7) and starts to buffer data packets coming from the PDP network and intended for the subscriber station MS. Once, in 8, the newly controlling node SGSN2 has confirmed its readiness to receive data by means of an "SGSN Context Acknowledge" message, the node SGSN1 passes the buffered data packets to the node SGSN2 in 9.

In order to ensure that data packets intended for the subscriber station MS are no longer routed to SGSN1 but directly to the new controlling node SGSN2, the gateway node GGSN is informed of the change. This is done by a request for adaptation of the context, which request is sent by the SGSN2 to the gateway node GGSN in 10.

While, in the situation where a context is transferred from a controlling node using the same version, the request for adaptation of the context would be an "Update PDP Context Request" message, the second controlling node in the situation under consideration uses a message of the "Create PDP Context Request" type as the request. In contrast to the "Update PDP Context Request" message in accordance with GTP Version 1, this message includes the IMSI and NSAPI of the terminal MS. With a message of this type, the gateway node does not expect that it will be transmitted with a defined TEID; it thus does not attempt to interpret any such TEID in the message but identifies the relevant context in the directory, which is maintained by it, directly on the basis of the IMSI and NSAPI. The context entry found in this way is updated by associating it with the new controlling node SGSN2 and the GTP version, once the communication process between the GGSN and the controlling node is complete.

Once the gateway node has successfully carried out this operation, it confirms this, in 11, to the new SGSN2 by means of a message which may be of the "Create PDP Context Response" or "Update PDP Context Response" type.

Before, in 18, the terminal MS receives a confirmation of its RAU request "Routing Area Update Accept", a message exchange also takes place between the two controlling nodes and the home location register HLR in the mobile radio communications system, in the course of which the association of the terminal MS with the new controlling node SGSN2 is noted in this register. These methods do not differ from the methods which are known for GSM or UMTS radio communication and will therefore not be described in detail here.

As an alternative to the use of the "Create PDP Context Request" message in 10, a message of the "Update PDP Context Request" type, modified slightly in comparison to the applicable GTP Version 1, can also be used. This modified message includes a TEID with the value 0 as well as the IMSI and NSAPI of the terminal MS. The gateway node GGSN does not itself allocate any TEIDs with the value 0. If it receives an "Update PDP Context Request" where TEID=0, then it can use this to deduce that the TEID has not been allocated by the gateway node GGSN and that, therefore, no entry in the context directory in the GGSN corresponds to it. In a situation such as this, the GGSN thus reverts to the IMSI and NSAPI in order to identify the context affected by the "Update PDP Context Request", and to update it as described above.

A further alternative for the updating request in 10 is for the second controlling node to in each case choose that GTP version in which it has received the "SGSN Context Acknowledge" message in S7, that is to say the Version 0 in this case. If, in this way, it outputs to the GGSN for the relevant context as a Version 0 node, the GGSN can identify the context to be adapted by stating a flow label, and likewise receives response messages in Version 0 from the gateway node. In this way, the context is transferred correctly to the new controlling node SGSN2, even if the GTP version being used remains the same.

A second method for transferring the tunnel from the first controlling node GGSN1 to the second GGSN2 differs from the signaling procedure illustrated in FIG. 4 in that the second controlling node, in step 10, also uses Version 0 for its request for updating the context, in which it has already received the flow label for the tunnel in 7. The gateway node likewise responds to this in step 11 using Version 0. This means that although the second controlling node SGSN2 and the gateway node GGSN are compatible with Version 1, they continue to handle the tunnel, which was set up using Version 0, using Version 0.

Since, in this second method, the version of the tunnel has not changed when it is transferred to the second controlling node, special precautions are required if the tunnel needs to be transferred a second time to a third controlling node of the Version 1 type.

When this Version 0 tunnel is transferred from a second to a third controlling node, both of which use Version 1, the same problems occur as those in the situation where a tunnel which has been set up between a first controlling node of the Version 1 type and a gateway node of the Version 0 type has to be transferred to a second controlling node of the Version 1 type. Some of the solutions to these problems, which will be described later on, are thus also applicable in this situation.

FIG. 2 shows a configuration in which a first node SGSN1 of the GTP Version 1 type, a gateway node GGSN of the GTP Version 1 type and a second controlling node SGSN2 of the Version 0 type communicate with one another. The first controlling node SGSN1 and the gateway node GGSN thus use messages of the Version 1 type, which are identified by the tunnel endpoint identifier TEID, between one another, and the two controlling nodes SGSN1 and SGSN2 use messages of the Version 0 type, which are identified by flow labels and TEIDs between one another.

Figure 5:
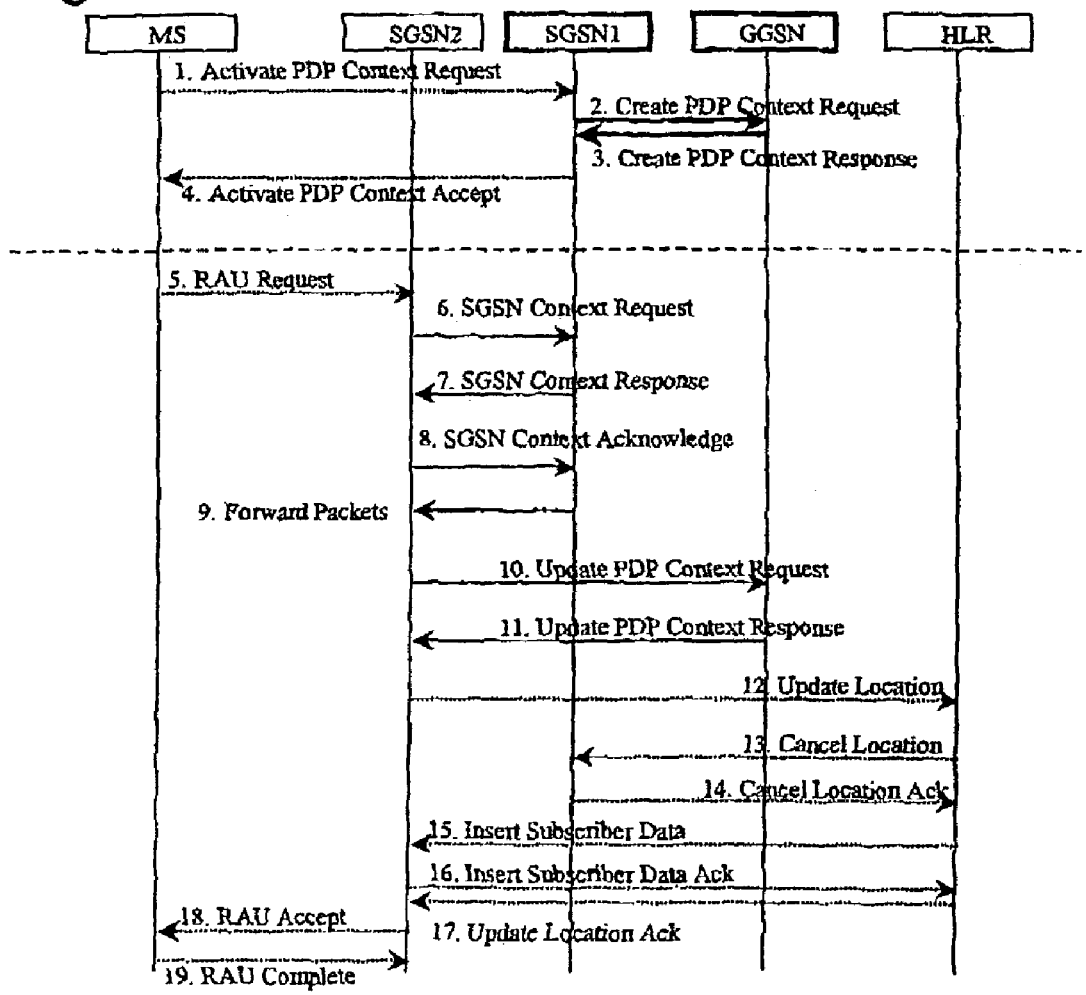

The sequence for setting up and transferring the tunnel, which is illustrated in FIG. 5, corresponds to that in FIG. 4. However, the GTP versions which are used for the various messages differ, once again identified by thick and thin arrows. The objectives of the context request "Create PDP Context Request" and the response to it in 2 and 3 correspond to those in FIG. 4, but with the difference that GTP Version 1 is used for them, and that, in consequence, the gateway node GGSN allocates a tunnel endpoint identifier TEID to the context, and signals this back to the first controlling node SGSN1.

The "SGSN Context Request" using GTP Version 0, which the second controlling node SGSN2 passes to the first in 6, is answered by the second controlling node SGSN2 using an "SGSN Context Response" of the Version 0 type. In the case of a channel transfer which takes place using only Version 0, the information element (IE) "PDP Context" of this message would include a flow label allocated by the gateway node to the first controlling node for this context. Since no such flow label exists here, the first controlling node, instead of this, calculates a flow label using a method defined in advance, from the TEID allocated by the gateway node GGSN. One particularly simple method for calculating the flow label is in each case to use the two least significant bytes of a TEID as the flow label, and to ignore the two most significant bytes. This flow label is used by the second controlling node SGSN2 in its request for context matching, which is sent to the gateway node in 10. Since the gateway node GGSN "knows" the method on the basis of which the first controlling node GGSN1 produces flow labels from TEIDs, on receiving the appropriate flow label in a request for context updating in 10 from the second controlling node, it can find a small number of contexts in its directory which could be affected by the update. Those which are actually affected amongst these can then be determined without any problems.

In another embodiment, the context is updated to use flow labels with the value 0, in a similar way to that described above with reference to FIG. 4. Since flow labels with this value are otherwise not allocated or at most are used by a controlling node of the Version 0 type in messages of the "Create PDP Context Request" type in which no flow label for the tunnel is yet known at the time at which the message is sent, when the gateway node GGSN receives a message with a flow label such as this with the value 0 from the second controlling node SGSN2, it can deduce from this that the flow label cannot have been allocated by itself and that, therefore, the message is associated with a tunnel, ignoring the flow label and using identification information that is also transmitted, that is to say the IMSI and NSAPI of the terminal included in the TID in the message header.

In another embodiment, a supplement to GTP Version 0 can also be provided, in which the second controlling node SGSN2 sends a message of the "Create PDP Context Request" type when it receives a message with a flow label set to 0 from the first controlling node.

Figure 3:
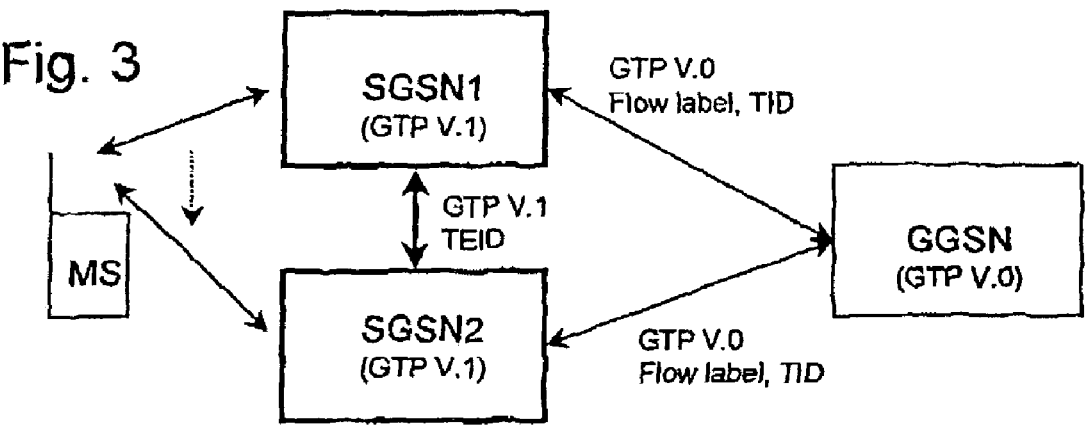
Figure 6:
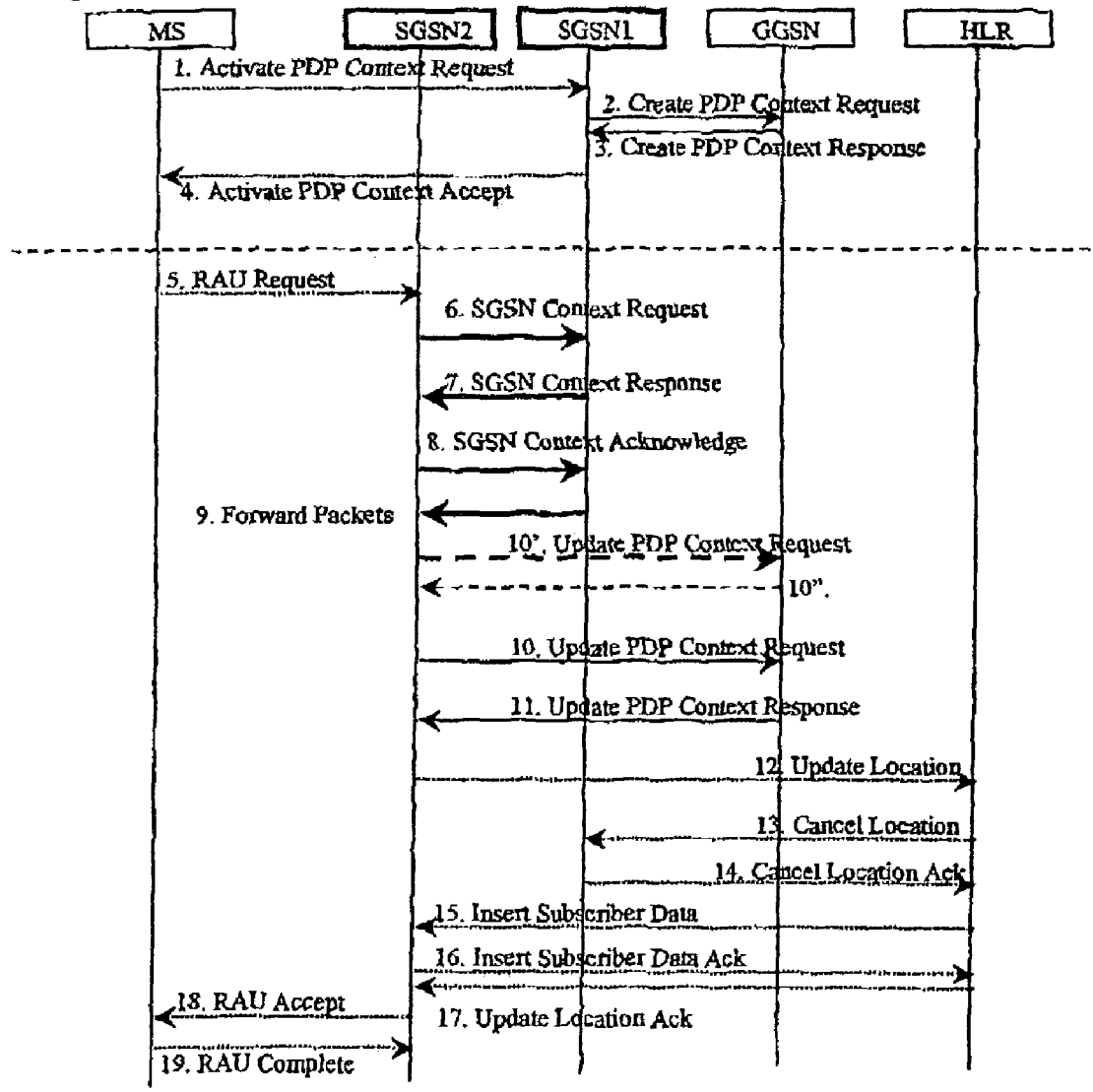

In the third constellation shown in FIG. 3, both controlling nodes SGSN1 and SGSN2 are nodes of the GTP Version 1 type, and the gateway node GGSN is a node of the Version 0 type. FIG. 6 shows how the tunnel is set up and transferred from the first controlling node SGSN1 to the second SGSN2. The process for setting up the tunnel in 1 to 4 takes place in the same way as that described with reference to FIGS. 1 and 4. The two controlling nodes have to use Version 1 between one another. Version 1 conveyed by a connection in order to transmit to the second controlling node SGSN2 the flow label which has been negotiated between the controlling node SGSN1 and the gateway node GGSN. In order to convey this flow label to the second controlling node SGSN2, the first controlling node SGSN1 adds to it two most significant bytes to form the format of TEID, which is transmitted to the second node SGSN2 in 7 (SGSN Context Response).

One aspect of the method results in two messages, which are represented by dashed arrows in FIG. 6, being exchanged: in 10', the node SGSN sends a request for context matching (Update PDP Context Request) of the Version 1 type to the gateway node GGSN. Since this is compatible with Version 0, it signals to the second node SGSN2 (10") that it cannot process the request. The second node uses this to identify the fact that the gateway node requires a Version 0 message with a flow label and then, in 10, produces a new request, this time of the Version 0 message type, in which it inserts as the flow label the two least significant bytes of the TEID received from the first node SGSN1.

Another aspect results in the first controlling node SGSN1 using two bytes with predetermined values, which are added to the flow label allocated to the tunnel to form the TEID format. This predetermined value, in this case 0, should then not be allocated during the normal production of a PDP context of the Version 1 type, so that the second controlling node SGSN2 can identify from the value of these two bytes that the information transmitted to it in the TEID format in 7 is in reality a flow label, which it reproduces and can thus from the start select the Version 0 message format, which can be interpreted by the gateway node GGSN, for the request for updating the context in 10.

In this aspect, the version used by the second controlling node SGSN2 for the update request is not defined by the gateway node GGSN in the dialog between it and the second node SGSN2, but is governed by the version of the SGSN Context Response message, this variant is also suitable for the situation described above in which a tunnel which was originally set up between a controlling node SGSN1 of the Version 0 type and a Version 1 GGSN and was then transferred to a second controlling node SGSN2 of the Version 1 type, while retaining the protocol version originally used for the tunnel at a third controlling node of the Version 1 type.

According to another aspect, the context information to be transmitted in 7 is also added to such that both flow labels and TEIDs can be transported, in each case identified as such. This may be done by adding an additional data field to the context information, which includes the flow label, so that, if known, both the TEID and the flow label can be transferred to the second controlling node SGSN2. It is also feasible to add a simple flag, whose status identifies the content of the TEID field in a message as TEID or as a flow label. In consequence, the value range for the TEID is not restricted.

This aspect is also suitable for transferring a tunnel operated using Version 0 to a third controlling node of the Version 1 type.

Still another aspect is also to use GTP Version 0 between the controlling nodes. The second controlling node GGSN2 admittedly starts the dialog with the first node SGSN1 using GTP Version 1, which the first node (SGSN1) understands; it would therefore normally have to respond using GTP Version 1. However, since the first node SGSN1 simulates that it "does not understand" GTP Version 1, it causes the second controlling node SGSN2 to use Version 0, so that the flow label can be transmitted. This variant also allows a Version 0 tunnel to be transferred while retaining the same version to a third controlling node.

What is claimed is:

1. A method for transferring a tunnel from a first controlling node in a mobile radio communications system to a second controlling node, the mobile radio communications system having controlling nodes and a gateway node, with at least one of the nodes being a node in accordance with Version 0 of a GTP protocol and other nodes being nodes of a Version 1 of General Packet Radio Service (GPRS) Tunnel Protocol (GTP) protocol, comprising:

receiving a message at the second controlling node about a requirement to transfer the tunnel from a terminal; and passing a request for matching the context relating to the tunnel to the gateway node, wherein when the first controlling node is a node of the Version 0 and the second controlling node and the gateway node are nodes of the Version 1, the request for adaptation of the context includes details of International Mobile Subscriber Identity (IMSI) Network Layer Service Access Point Identifier (NSAPI) for a relevant tunnel.

2. The method as claimed in claim 1, wherein the request for matching the context relating to the tunnel is a message of the "Create PDP Context Request" message.

3. The method as claimed in claim 1, wherein the request for adaptation of the context is a message of an "Update PDP Context Request" message, which includes a Tunnel Endpoint Identifier (TEID) with a value 0, and which includes details of IMSI and NSAPI for the tunnel.

4. The method as claimed in claim 1, wherein the gateway node and the second controlling node operate the transferred tunnel of the Version 0 of the GTP protocol.

5. A method for transferring a tunnel from a first controlling node in a mobile radio communications system to a second node, the mobile radio communications system having controlling nodes and a gateway node, with at least one of the nodes being a node in accordance with Version 0 of GTP protocol and other nodes being nodes of a Version 1 of the GTP protocol, comprising:

receiving a message at the second controlling node about a requirement to transfer the tunnel from a terminal; and passing a request for matching a context relating to the tunnel to the gateway node, wherein the first controlling node and the gateway node are nodes of a Version 1, and the second controlling node is a node of a Version 0, or when the gateway node is a node of the Version 0 and the controlling nodes are each nodes in accordance with Version 1, the first controlling node transmits a flow label, which is associated with the context, to the second controlling node, and the second controlling node sends the request for adaptation of the context relating to the tunnel, with the associated flow label being inserted.

6. The method as claimed in claim 5, wherein when the first controlling node and the gateway node are nodes of the Version 1, and the second controlling node is a node of the Version 0, the first controlling node associates a flow label with a pre-determined value with the context, which value is specific for a transfer of the tunnel from a controlling node of the Version 1 to a controlling node of the Version 0.

7. The method as claimed in claim 6, wherein a value of the flow label is 0.

8. The method as claimed in claim 5, wherein the second controlling node sends a message of a "Create PDP Context Request" message as the request for adaptation of the context relating to the tunnel.

9. The method as claimed in claim 5, wherein when the first controlling node and the gateway node are nodes of the Version 1 and the second controlling node is a node of the Version 0, the first controlling node allocates the flow label to each established context of the Version 1, and the gateway node allocates the same flow label.

10. The method as claimed in claim 9, wherein a method for allocation of the flow label comprises equating the flow label to the two least significant bytes of the TEID.

11. The method as claimed in claim 5, wherein when the gateway node is a node of the Version 0 and the controlling nodes are nodes of the Version 1, the flow label which is allocated to the tunnel by the gateway node is transmitted in the TEID field of a first message which is sent from the first controlling node to the second controlling node.

12. The method as claimed in claim 11, wherein the second controlling node sends a request for context updating based on Version 1 to the gateway node, and if the gateway node cannot process the request, the second controlling node extracts the flow label from the TEID field and sends a new request based on Version 0 using the extracted flow label.

13. The method as claimed in claim 11, wherein a predetermined value is entered in TEID field bytes which are not filled by the flow label, which value is specific for the transfer of a tunnel between two controlling nodes of the Version 1 via a gateway node of the Version 0.

14. The method as claimed in claim 13, wherein the second controlling node sends the request for context updating using Version 0 when the TEID field includes the predetermined value.

15. The method as claimed in claim 13, wherein the specific value is 0.

16. The method as claimed in claim 11, wherein, in addition to the TEID field, an identifier is transmitted, which indicates whether the TEID field includes a TEID or a flow label.

17. The method as claimed in claim 5, wherein when the gateway node is a node of the Version 0 and the controlling nodes are nodes of the Version 1, the flow label which is allocated to the tunnel by the gateway node is transmitted in a specific data field, which is not the TEID field, in a message from the first controlling node to the second controlling node.

* * * * *